June 21, 1960

D. I. JACOBSON 2,941,542

ANTI-SIPHON BALL COCK VALVE

Filed Nov. 2, 1956

INVENTOR.
DAVID I JACOBSON
BY
Price and Heneveld

United States Patent Office 2,941,542
Patented June 21, 1960

2,941,542

ANTI-SIPHON BALL COCK VALVE

David I. Jacobson, Grand Haven, Mich., assignor to Grand Haven Brass Foundry, Grand Haven, Mich., a corporation of Michigan Filed Nov. 2, 1956, Ser. No. 620,060

1 Claim. (Cl. 137—218)

This invention relates to valves of the type employed for controlling supply of water to a reservoir, and more particularly, to a float actuated valve or ball cock valve as it is known in the trade for maintaining a supply of water in a reservoir such as a flush tank for toilet fixtures.

Various types of anti-siphonic ball cock valves have been developed. The plumbing regulations require that if a hush tube extending into the water is used for quieting the operation of the system, some type of anti-siphonic means be provided. A test required by the plumbing code of Chicago, Illinois, specifies that when a vacuum of 22 inches of mercury is created on the water supply pipe, no water can be drawn from the tank through the supply pipe. The suction created by this vacuum can only draw air from the ambient atmosphere by means of the anti-siphonic valve.

On most ball cock valves the water when filling the tank rushes through a restricted passageway resulting in an annoying noise. Attempts have been made on anti-siphonic ball cock valves to eliminate this problem but no completely satisfactory solution has been found. The attempts of reducing this noise have either involved a very expensive construction, the noise is not substantially eliminated or its anti-siphonic action is not satisfactory.

The primary object of this invention is to provide an improvement in anti-siphonic ball cocks capable of avoiding the danger of contaminating the fresh water supply.

A further object of this invention is to provide an anti-siphonic ball cock valve capable of operating more smoothly and quietly.

Still another object of this invention is to provide an anti-siphonic ball cock capable of eliminating any suction on the hush tube.

Another object of this invention is to provide a ball cock valve mechanism whose parts are so structurally designed that when vacuum is created in the supply line or pipe it will act automatically on a valve that shuts off the communication between the supply pipe and the hush tube thus preventing contaminated water contained in the reservoir from being drawn into the supply line.

Another object of this invention is to provide a ball cock assembly having a valve that is positively adapted to shut off the communication between the hush tube and the supply line and having anti-siphonic means which when the valve is accidentally open causes any vacuum in the supply line to draw air from the ambient atmosphere rather than water through the hush tube.

Other objects of this invention will become obvious upon reading the following specification in conjunction with the accompanying drawings wherein.

Figure 1:
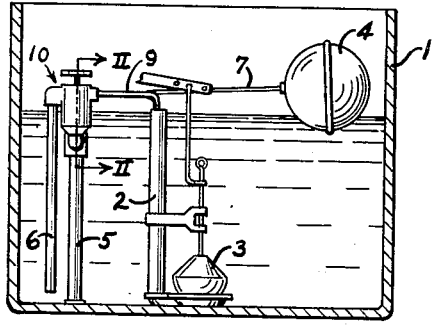
Fig. 1 is a side elevation of the improved ball cock assembly positioned in a toilet closet tank and associated with a conventional flush valve.

Briefly this invention includes a ball cock comprising first and second valve chambers having means for communication with each other. The first chamber communicates with a supply line and the second chamber communicates with a tank fill pipe or the so called hush tube.

Both of the chambers have separate valve means. The valve means in the first chamber is adapted to shut off communcation between the chambers. The valve in the second chamber is adapted to shut off communication between the second chamber and the atmosphere. The actuation of this second valve means is responsive to the flow of water through the two chambers and into the hush tube.

Referring to the drawing reference numeral 1 denotes a reservoir tank or closet for a toilet. This tank is normarlly filled with water. It has an overflow pipe 2 for controlling the level of the water. The water is used for flushing the toilet by means of valve 3. The tank 1 is filled by a supply line or pipe 5 on top of which is a ball cock valve assembly 10. The water flows through the pipe 5, the ball cock valve assembly 10, and into the hush tube 6 which extends downwardly into the water to eliminate splashing noises. Water also flows through the refill tube 9, supply tube 5, and into the bowl of the toilet refilling it. The ball cock 10 is controlled by a float 4 connected to a lever 7 that actuates the valve.

This invention relates to the construction of the ball cock valve assembly 10 which includes a valve body 11 having two chambers 12 and 13. Chamber 12 is cylindrical and of approximately the same diameter as the supply tube 5. It has a shank portion 31 at its lower end supporting the supply tube 5. Immediately above the shank portion 31 is located a tubular nylon element 15 that serves as a seat for the plunger valve element 14. The nylon seat 15 extends beyond the inlet of passageway 17 that serves as the communication means between the chambers 12 and 13. Sufficient space is provided for the water to pass through and over the nylon seat 15 and into the passageway 17. The valve 14 has a rubber seat 16 and a leather seal ring 32. Valve element 14 is freely mounted for sliding movement in the cylindrical chamber 12.

The lever 7 of the float 4 extends through a slot (not shown) of housing above the valve element 14. The extreme end of the lever is shaped so as to prevent it from being withdrawn through the slot. The lever is held in place by an adjustable screw 8 screwed into the top of the housing for the chamber 12. This screw is adapted to adjust the operation of the valve in a well known manner.

The chamber 13 is also circular in cross section. It has a greater cross sectional area than the chamber 12. Chamber 13 is tapered at its bottom end 18 which terminates at an entrance 19 from passageway 17. The chamber 13 has a tapped opening at its top end for receiving a cap 21. The cap 21 has a main body with a central bore 22. The bore 22 extends into a tubular extension 23 extending downwardly from the main body. The tubular extension 23 extends downwardly to a point beyond the port 28 to the hush tube 6. The purpose of this structure will be explained in more detail under "Operations."

A substantial portion of the bore 22 is chamfered. This chamfer is of increasingly greater diameter from the lower portion to the upper portion. This provides a continuously smooth bore through which the air in the atmosphere can flow into the chamber 13. A cover 25 is mounted above the bore 22. It is supported by a pair of support columns 26. It is important that essentially the entire bore 22 be exposed to the air for permitting the air to flow into chamber 13.

A ball 27 is located in chamber 13. This ball is slightly greater in diameter than both the diameter of port 19 and the bore of the extension 23. The ball is preferably made of rubber or other resilient material that will give to some extent in order to provide an effective seal at the port 19 and bore 22.

Figure 6:
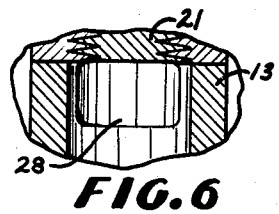
Fig. 6 is an enlarged, fragmentary, cross-sectional view taken along the plane VI—VI of Fig. 4.

Chamber 13 has an exit water port 28 leading into hush tube 6 which is supported by the nipple 29. This port 28 (Fig. 6) is rectangular in shape, the longest sides extending in a circumferential direction around chamber 13.

The size and position of the various ports of chamber 13 are important for obtaining satisfactory results with this assembly. The bore 22 and the port 19 are centered within the chamber 13. These ports and the chamber are all coaxial, that is, their center axes lie on the same line. This is important for proper functioning of the ball valve. Otherwise the ball is caught in a corner and fails to properly close the appropriate ports.

The cross sectional area of port 22 having diameter D is at least as great as the cross sectional area of port 19. The cross sectional area of the entire chamber 13 measured by diameter $D_1$ is at least twice as great as the cross sectional area of port 19. The cross sectional area of bore 22 is greater than the cross sectional area of the port 28 between the chamber 13 to hush tube 6 in the plane. The diameter $D_2$ of the chamfered portion of bore 22 is at least twice as great as the diameter of port 19. These dimensions are necessary for proper withdrawal of air through the chamber when suction is supplied to the supply line.

Although the cover 25 is not necessary for proper operation of this assembly, it is required by the plumbing codes. I have found that in this apparatus the spacing "S" of the cover 25 from the main body of the cap to be at least as great as the smallest diameter of bore 22. I have also found that chamfering bore 22 is necessary to provide a smooth air passageway. This chamfer 24 eliminates any sharp corners on the air passage.

In describing this invention so far I have shown a separate cap screwed into the chamber 13. In the broadest aspect of this invention the structure of cap 21 can be made integral with chamber 13. Such a structure may be difficult to construct but nevertheless is considered to be covered by the broadest aspect of this invention The chamber 13 also has a passageway 30 leading to the refill tube 9. Since a comparatively small body of water is required by the refill tube 2, port 30 is substantially smaller than the port 28 leading to the flush tube 6.

Operation

Figure 2:
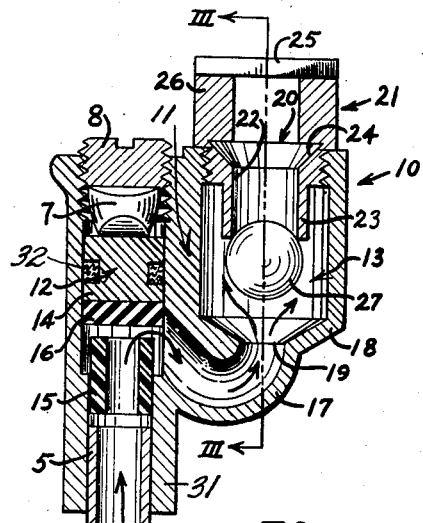
Fig. 2 is an enlarged cross-sectional, elevational view of the ball cock assembly.
Figure 3:
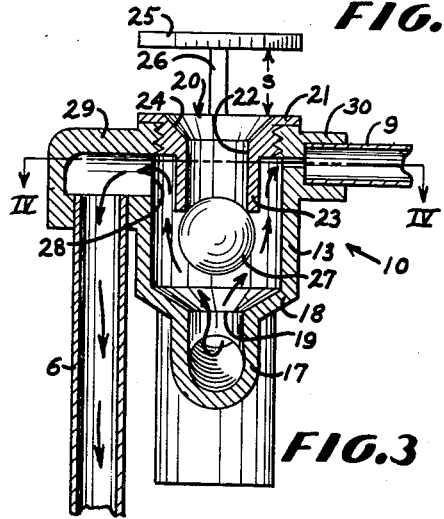
Fig. 3 is a cross-sectional, elevational view of the ball cock assembly taken along the plane III—III of Fig. 2.
Figure 4:
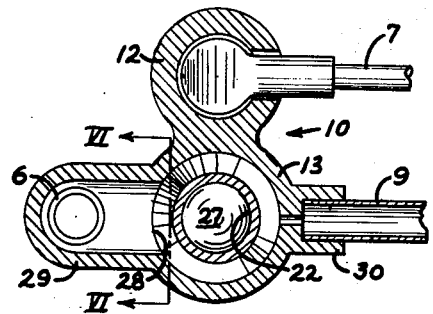
Fig. 4 is a cross-sectional, plan view of the ball cock assembly taken along the plane IV—IV of Fig. 3.
Figure 5:
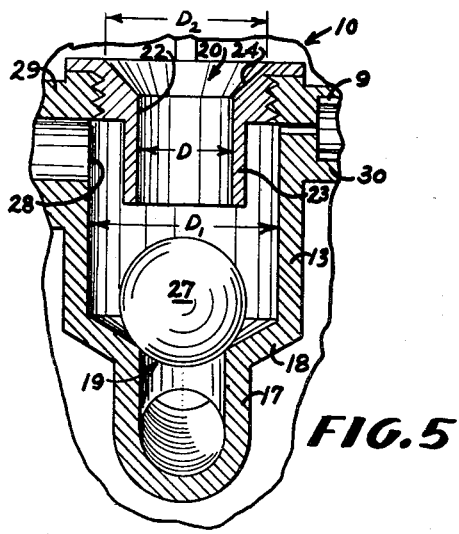
Fig. 5 is a cross-sectional, elevational view similar to that of Fig. 2 but enlarged and illustrating the comparative sizes of the valve chambers and their ports. This figure shows the ball in a down position shutting off communication between the supply line and the hush tube.

Having described my invention, the operation is relatively simple. When the ball cock assembly is properly assembled on supply tube 5, water flowing through supply tube 5 is normally prevented from flowing into the chamber 13. However when the level of the water in tank 1 is lowered by flushing the toilet or otherwise, the float drops as it follows the level of the water. This causes the end of the lever 7 which is located above the valve 14 to pivot upwardly. The force of the water beneath valve 14 forces the plunger valve 14 upwardly and the water flows through the nylon seat 15 and past the rubber seat 16 of valve 14 through the passageway 17 and into the chamber via the port 19 (Fig. 2). As the water flows through the port 19 the ball 27 is forced upward and caused to seat on the extension 23 over bore 22. This cuts off communication between chamber 13 and the ambient atmosphere. Water continues to flow into the chamber, out of the port 28, and into and through the hush tube 6 (Fig. 3). Eventually it reaches the inside of tank 1.

As previously described, the cross sectional area of the chamber 13 is substantially greater than the cross sectional area of the chamber 12. As a result the water is permitted to flow into the chamber 13 reducing its velocity and pressure and thus the usual resulting hissing noise. The enlarged chamber 13 thus quiets the entire operation of the mechanism. The hush tube extending underneath and into the water also quiets the operation of the entire system.

When the tank is filled to the proper depth, which according to the code is 1 inch below the lowest point of the valve body 11, the float rising to that level causes lever 7 to push downwardly on the valve 14. As a result the rubber seat 16 is seated on the nylon seat 15 cutting off all supply of water through the chamber 13 and hush tube 6.

It is generally known to those skilled in the plumbing art that various conditions create a vacuum at the supply line 5. Without an anti-siphonic ball cock, this vacuum will draw the water up into the hush tube and eventually into the supply line. An analysis of water samples taken from drinking fountains, etc. has shown that these conventional type valve contaminate the water with undesirable and injurious bacteria. Therefore the plumbing codes have required a test to prevent such contamination. This test includes creating a vacuum of 22" of mercury at the supply line. At such vacuum no water can be drawn through the hush tube and into the supply line.

In accordance with this invention to prevent such contamination, I provide the ball valve 27 that seats in the port 19. When suction is created on the supply line the ball is drawn into the port 19 preventing water from flowing through the hush tube in the supply line. When water is flowing into tank 1 through chamber 13 the ball is forced off from port 19.

The usual plumbing codes provide that no water can be drawn by the suction previously referred notwithstanding the presence of the ball. In other words, if the rubber ball is prevented from closing port 19 by a wire on its circumference or any other means, the valve of assembly must operate so that at a vacuum of 22 inches of mercury the supply line cannot draw water from the hush tube. In order to satisfy this requirement I have provided the port 22 through the cap 21. I have discovered that port has to be of the particular size and shape in order to produce the desired result. The ports as previously described produce the desired result. Thus when suction is created at the supply tube by a vacuum condition, air is drawn rather than water which might contaminate the supply.

Having described my invention it should become obvious that I have described one embodiment. Other embodiments and modifications are possible within the broadest aspect of this invention. Therefore, such modifications and embodiment coming within the spirit of this invention are covered unless the language of the appended claim expressly state otherwise.

I claim:

In a ball cock valve an anti-siphon valve means comprising a valve chamber; an entrance port at the bottom of said chamber; said chamber having a circular cross section; said chamber communicating with a tank fill pipe by an outlet port located above said entrance port; a cylindrical valve seat member extending downwardly from the top of said chamber toward said passageway entrance port; said valve seat member being of a smaller diameter than said chamber providing an annular space between the wall of said chamber and said cylindrical valve seat member; said valve seat member having a passage leading to the exterior of said valve body; a valve element located in said chamber and adapted to seat on said cylindrical valve seat member when water is flowing through said chamber into said fill pipe and in said passageway entrance port when such flow is discontinued; said valve seat member, and said passageway entrance port being coaxial; said valve element being a ball of slightly larger diameter than said valve seat and said passageway entrance, and the annular space between said valve seat member and the wall of said chamber being less than the diameter of said ball; said valve seat member extending below the outlet port leading to said tank fill pipe.

References Cited in the file of this patent

UNITED STATES PATENTS

| | | |
|---|---|---|
| 2,117,389 | Yoder | May 17, 1938 |
| 2,173,070 | Brown | Sept. 12, 1939 |
| 2,245,653 | Dierker | June 17, 1941 |
| 2,290,438 | Kohlmeyer | July 21, 1942 |
| 2,324,084 | Horner | July 13, 1943 |
| 2,502,211 | Dyer | Mar. 28, 1950 |
| 2,615,676 | Neubauer | Oct. 28, 1952 |
| 2,652,849 | Ebbs et al. | Sept. 22, 1953 |
| 2,664,261 | Stephany | Dec. 29, 1953 |

OTHER REFERENCES

Fluid Mechanics by Daugherty and Ingersoll, 5th edition, pp. 123, Fig. *a*.